United States Patent
Mathe et al.

(10) Patent No.: US 8,340,432 B2
(45) Date of Patent: *Dec. 25, 2012

(54) SYSTEMS AND METHODS FOR DETECTING A TILT ANGLE FROM A DEPTH IMAGE

(75) Inventors: Zsolt Mathe, Issaquah, WA (US); Charles Claudius Marais, Duvall, PA (US)

(73) Assignee: Microsoft Corporation, Redmond, WA (US)

( * ) Notice: Subject to any disclaimer, the term of this patent is extended or adjusted under 35 U.S.C. 154(b) by 811 days.

This patent is subject to a terminal disclaimer.

(21) Appl. No.: 12/485,804

(22) Filed: Jun. 16, 2009

(65) Prior Publication Data

US 2010/0278431 A1    Nov. 4, 2010

Related U.S. Application Data

(60) Provisional application No. 61/174,973, filed on May 1, 2009.

(51) Int. Cl.
*G06K 9/46* (2006.01)

(52) U.S. Cl. ..................................... 382/190

(58) Field of Classification Search ............ 382/103, 382/154, 190, 289, 209; 348/42, 48, 50, 348/169
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

CN    201254344 B    6/2010

(Continued)

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

(Continued)

*Primary Examiner* — Daniel Mariam
(74) *Attorney, Agent, or Firm* — Woodcock Washburn LLP

(57) ABSTRACT

A depth image of a scene may be received, observed, or captured by a device. A human target in the depth image may then be scanned for one or more body parts such as shoulders, hips, knees, or the like. A tilt angle may then be calculated based on the body parts. For example, a first portion of pixels associated with an upper body part such as the shoulders and a second portion of pixels associated with a lower body part such as a midpoint between the hips and knees may be selected. The tilt angle may then be calculated using the first and second portions of pixels.

17 Claims, 12 Drawing Sheets

U.S. PATENT DOCUMENTS

| | | | |
|---|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,580,563 B1 | 6/2003 | Finney |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 * | 3/2008 | Gokturk et al. ............ 382/103 |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,646,372 B2 * | 1/2010 | Marks et al. ............ 345/156 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |

| | | |
|---|---|---|
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,978,081 B2* | 7/2011 | Shears et al. ............... 340/573.1 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2004/0207597 A1 | 10/2004 | Marks |
| 2005/0031166 A1* | 2/2005 | Fujimura et al. ............... 382/103 |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0279494 A1* | 12/2007 | Aman et al. ............... 348/169 |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2008/0298637 A1 | 12/2008 | Hu et al. |
| 2009/0041338 A1 | 2/2009 | Sawachi et al. |
| 2009/0141933 A1 | 6/2009 | Wagg |
| 2009/0167679 A1 | 7/2009 | Klier et al. |
| 2009/0221368 A1 | 9/2009 | Yen et al. |
| 2009/0252423 A1 | 10/2009 | Zhu et al. |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2001 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Seemann, E. et al, "Head Pose Estimation Using Stereo Vision for Human-Robot Interaction," Sixth IEEE International Conference on Automatic Face and Gesture Recognition (FG '04), May 17-May 19, 2004, 1-6 http://isl.ira.uka.de/fileadmin/publication-files/Seemann_FG2004.pdf.

Wu, B. et al, "Detection of Multiple, Partially Occluded Humans in a Single Image by Bayesian Combination of Edgelet Part Detectors," 10th IEEE International Conference on Computer Vision (ICCV 2005), Beijing, China. IEEE Computer Society, Oct. 17-20, 2005, 8 pages, http://iris.usc.edu/Outlines/papers/2005/wu-nevatia-iccv.pdf.

Jankovic, N. et al., "A Centralized Omnidirectional Multi-Camera System with Peripherally-Guided Active Vision and Depth Perception," Networking, Sensing and Control, 2007 IEEE International Conference on, Apr. 15-17, 2007, 662-667 http://media.michaelnaish.com/publications/icnsc2007.pdf.

Taylor, T. et al, "Using Camera Tilt to Assist with Localisation," In Proceedings of the 3$^{rd}$ International Conference on Autonomous Robots and Agents (ICARA), Massey University, Palmerston North, New Zealand, Dec. 12-14, 2006, 7 pages http://eprints.qut.edu.au/5512/1/5512_1.pdf.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

SYSTEMS AND METHODS FOR DETECTING A TILT ANGLE FROM A DEPTH IMAGE

CROSS-REFERENCE TO RELATED APPLICATIONS

This application claims the benefit under 35 U.S.C. §119 (e) of U.S. Provisional Patent Application No. 61/174,973 filed May 1, 2009, the disclosure of which is incorporated herein by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for detecting a tilt angle from a depth image. For example, a depth image of a scene may be received, captured, or observed by, for example, a capture device. The depth image may then be analyzed to determine whether the image includes a human target associated with a user. If the image includes a human target associated with a user, the human target may be scanned to determine, for example, a location and/or measurements of one or more body parts. According to an example embodiment, a tilt angle may be calculated based on the body scan. For example, the capture device may be tilted upward or downward such that information including the depth images captured by the capture device may be distorted or skewed based on the tilt. After scanning the human target, a first portion of the human target associated with an upper body part such as the shoulders and a second portion of the human target associated with a lower body part such as a midpoint between the hips and knees may be used to calculate a tilt angle. For example, in one embodiment, the first and second portions may define a line therebetween that may be used to calculate a tangent value. According to an example embodiment, the tangent value may be used to calculate the tilt angle. The tilt angle may then be processed such that the tilt angle may be used to adjust, for example, a model by rotating to an upright orientation, a capture device by physically rotating the capture device, and/or by transforming an image such as the depth image, an RGB image, or the like captured by the capture device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1A:
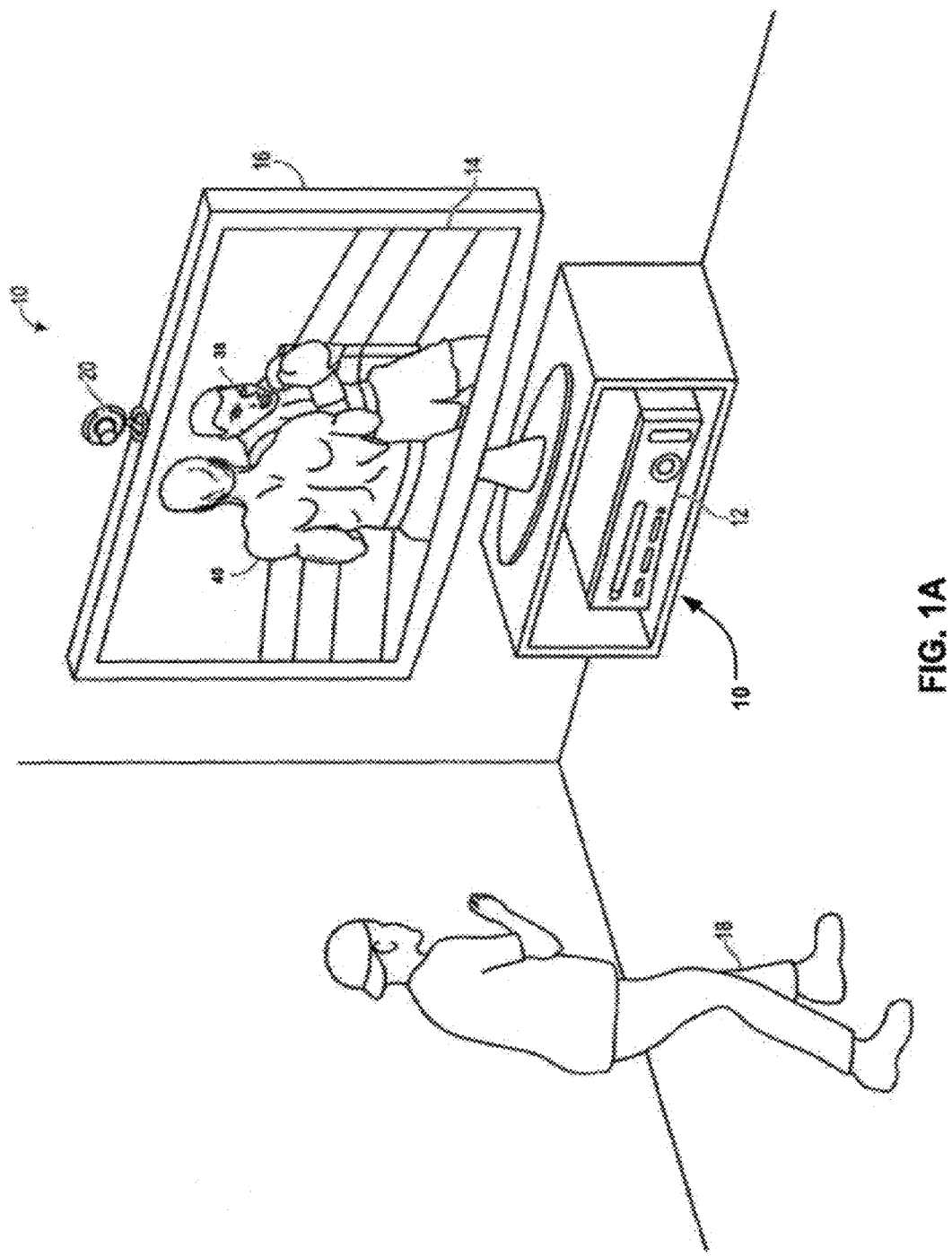
FIGS. 1A and 1B illustrate an example embodiment of a target recognition, analysis, and tracking system with a user playing a game.
Figure 1B:
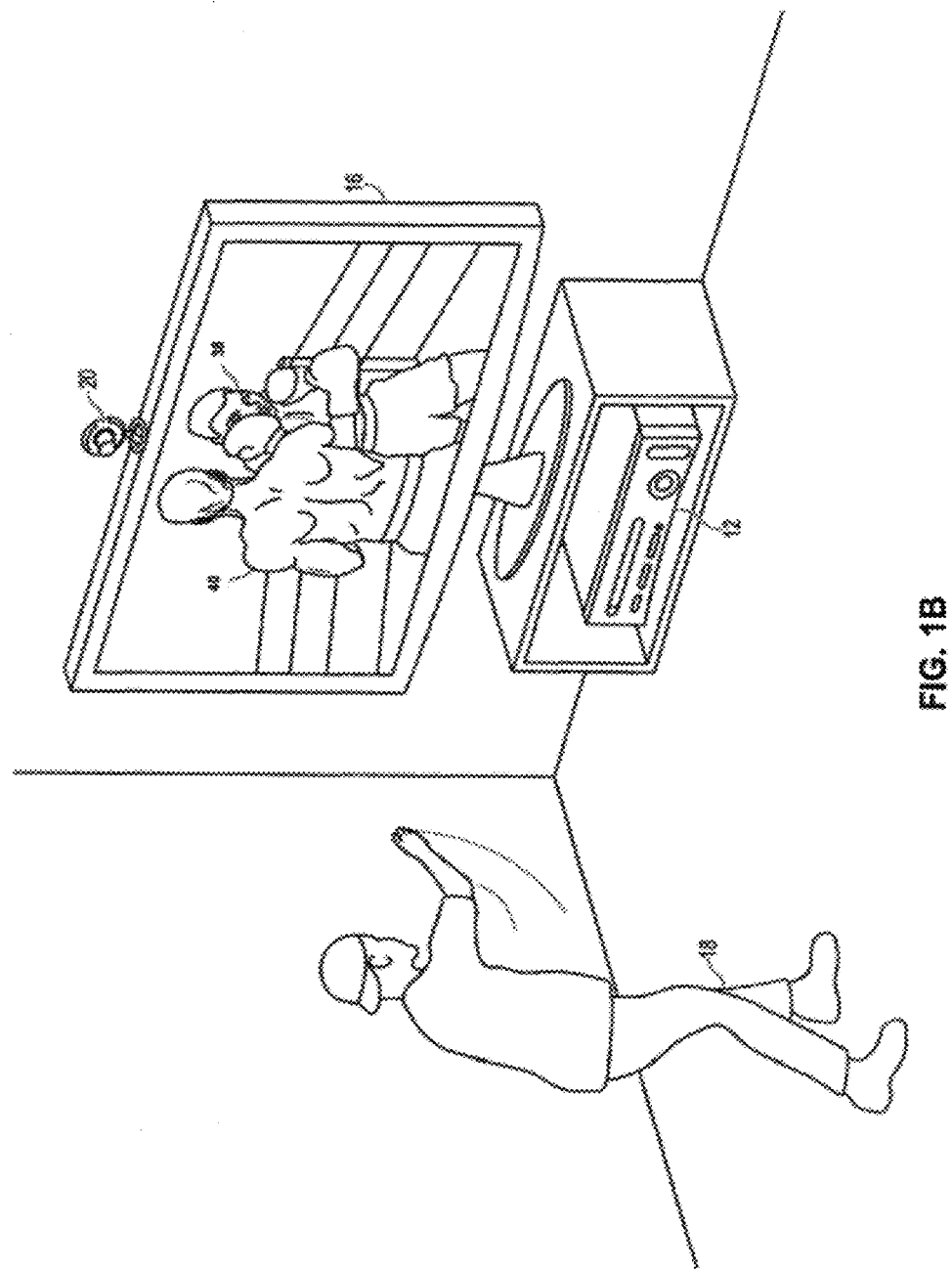

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image, scanning a human target in the depth image, and calculating a tilt angle based on the scanned human target, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
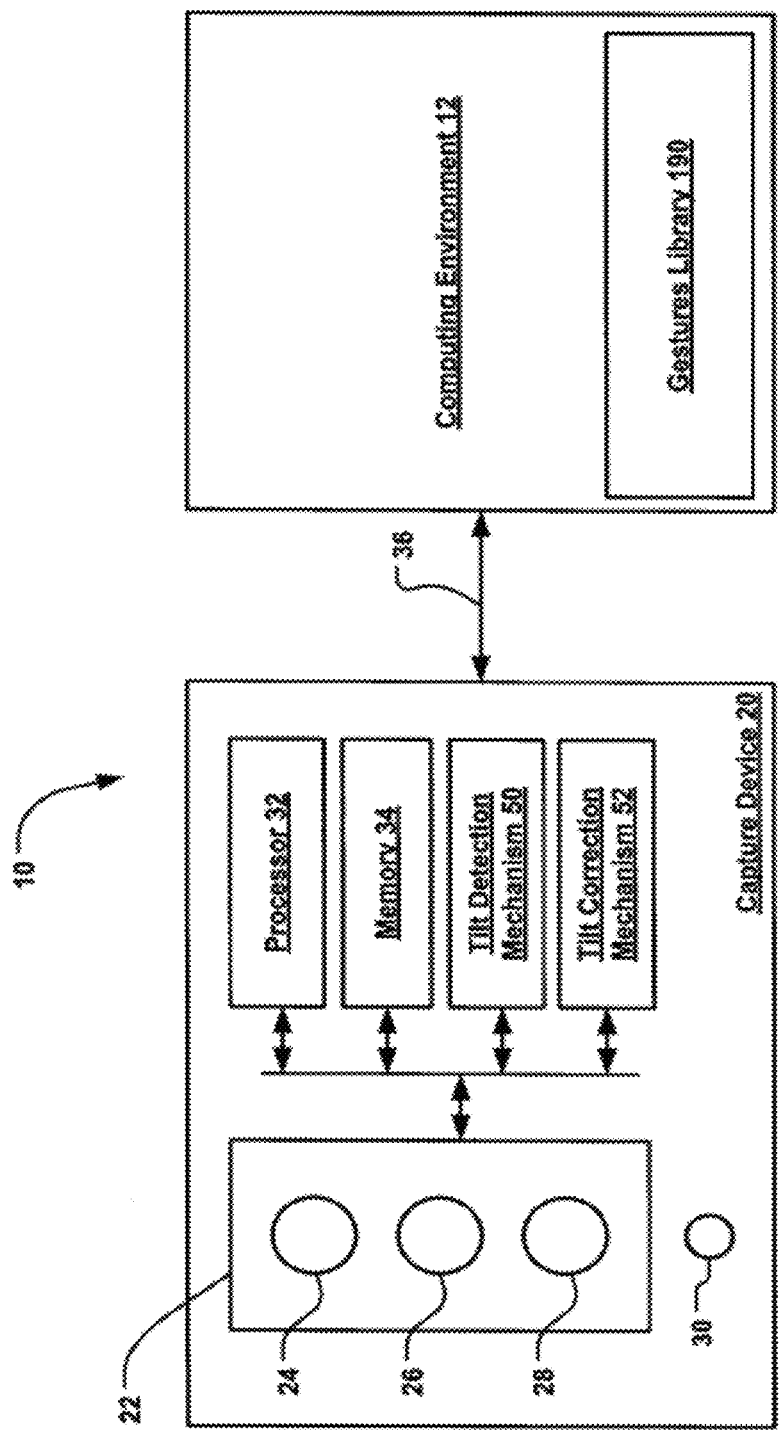
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image, scanning a human target in the depth image, and calculating a tilt angle based on the scanned human target, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

According to an example embodiment, the capture device 20 may further include a tilt detection mechanism 50 and a tilt correction mechanism 52. The tilt detection mechanism 50 may be a device that may detect a tilt or angle of the capture device 20. For example, the tilt detection mechanism 50 may include a microminiaturized cantilever-type spring that may convert a force associated with the tilting of the capture device 20 into a measurable displacement associated with a tilt angle of the capture device 20. Alternatively, the tilt detection mechanism 50 may include a heated gas bubble with one or more thermal sensors. When the capture device 20 may be tilted the sensors may detect a location of the gas bubble that may be used to determine a tilt angle associated with the capture device 20. According to example embodiments, the tilt detection mechanism 50 may be an accelerometer, a potentiometer, a tilt sensor, or any other suitable device that may be used to detect a tilt angle of the capture device 20.

In an example embodiment, the tilt correction mechanism 52 may be a device that may adjust an angle of the capture device 20. For example, the tilt correction mechanism 52 may be a motor, or the like that may be used to adjust the angle of the capture device 20.

Figure 3:
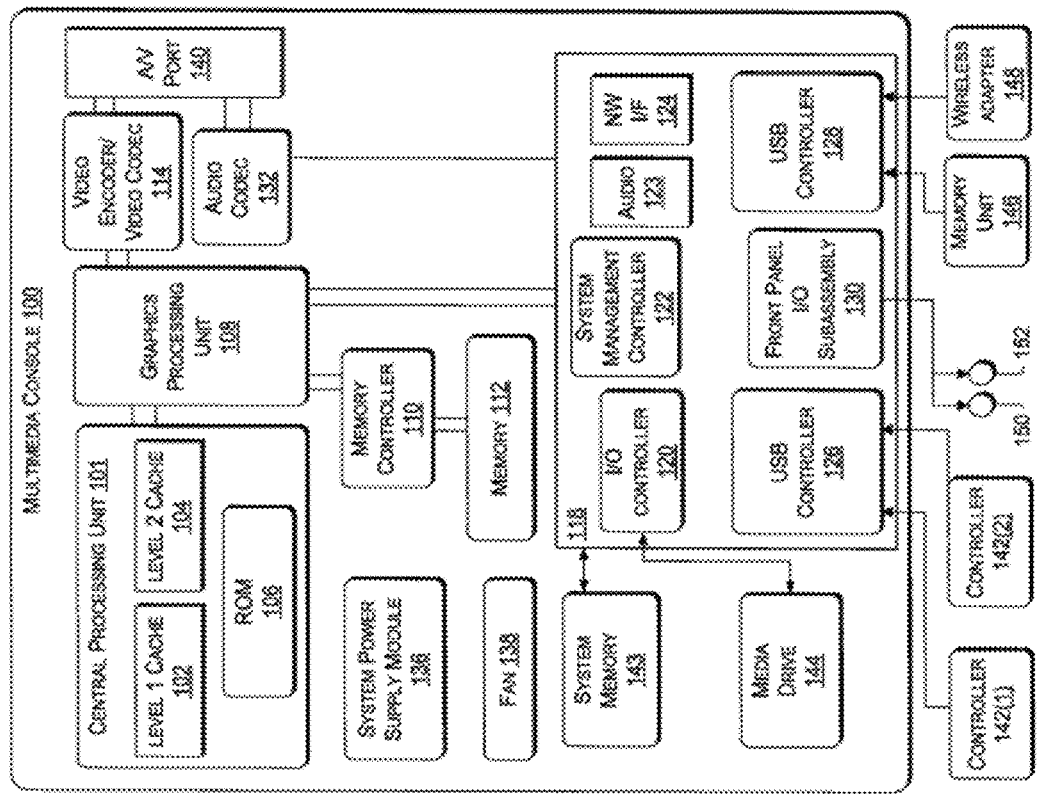
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
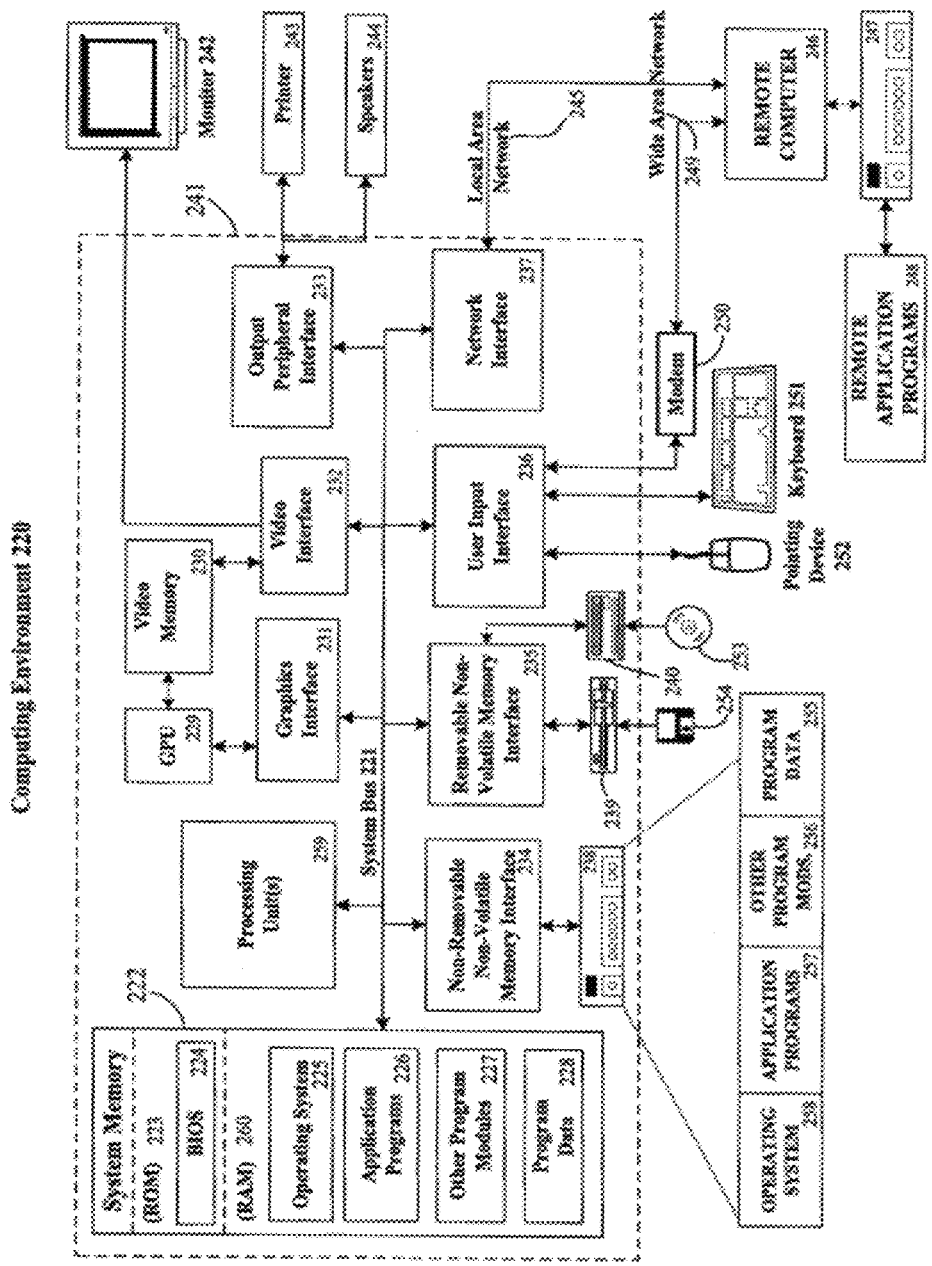
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
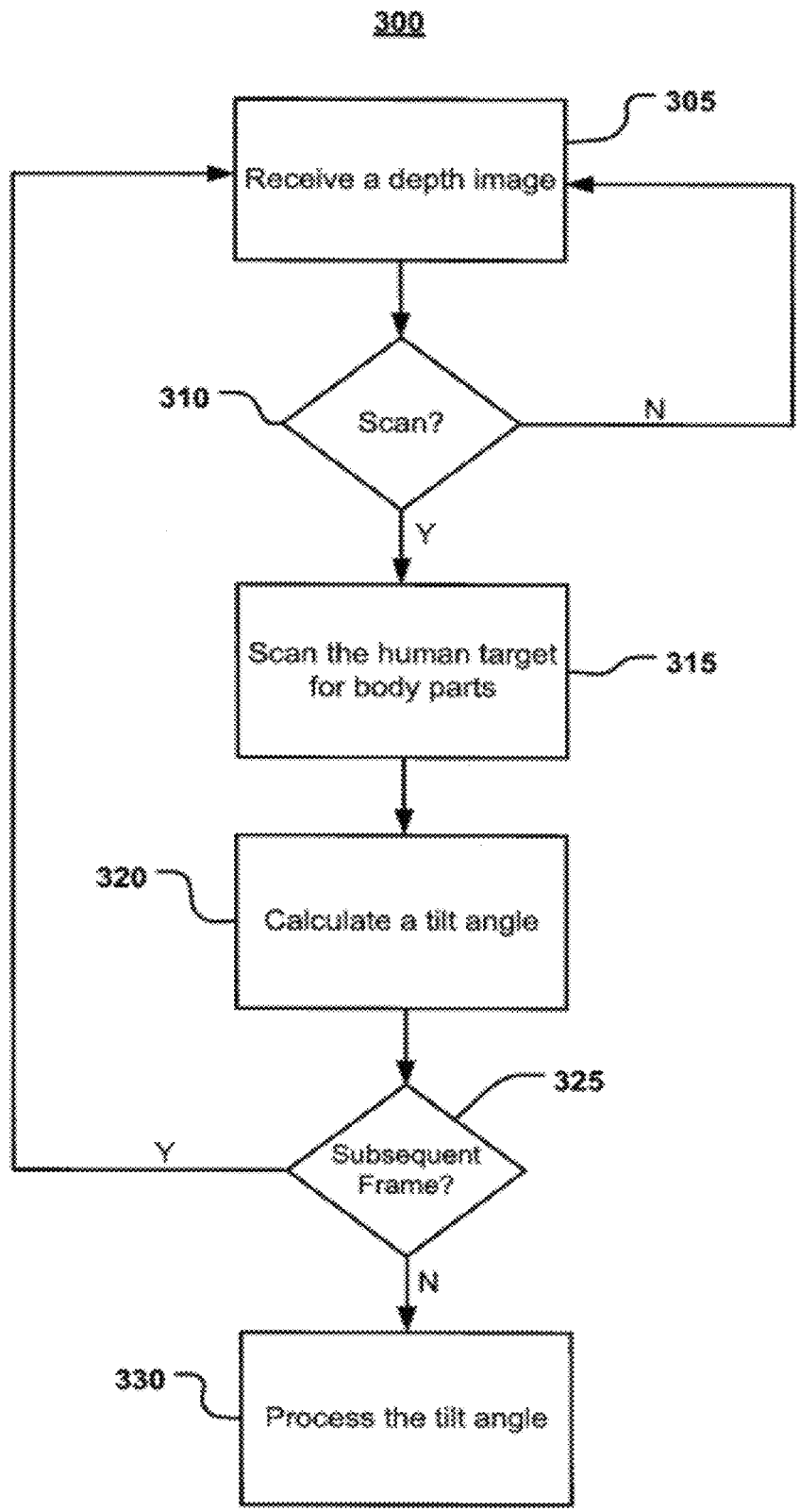
FIG. 5 depicts a flow diagram of an example method for detecting a tilt angle of a capture device.

FIG. 5 depicts a flow diagram of an example method 300 for detecting a tilt angle of a capture device. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, a depth image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as an a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
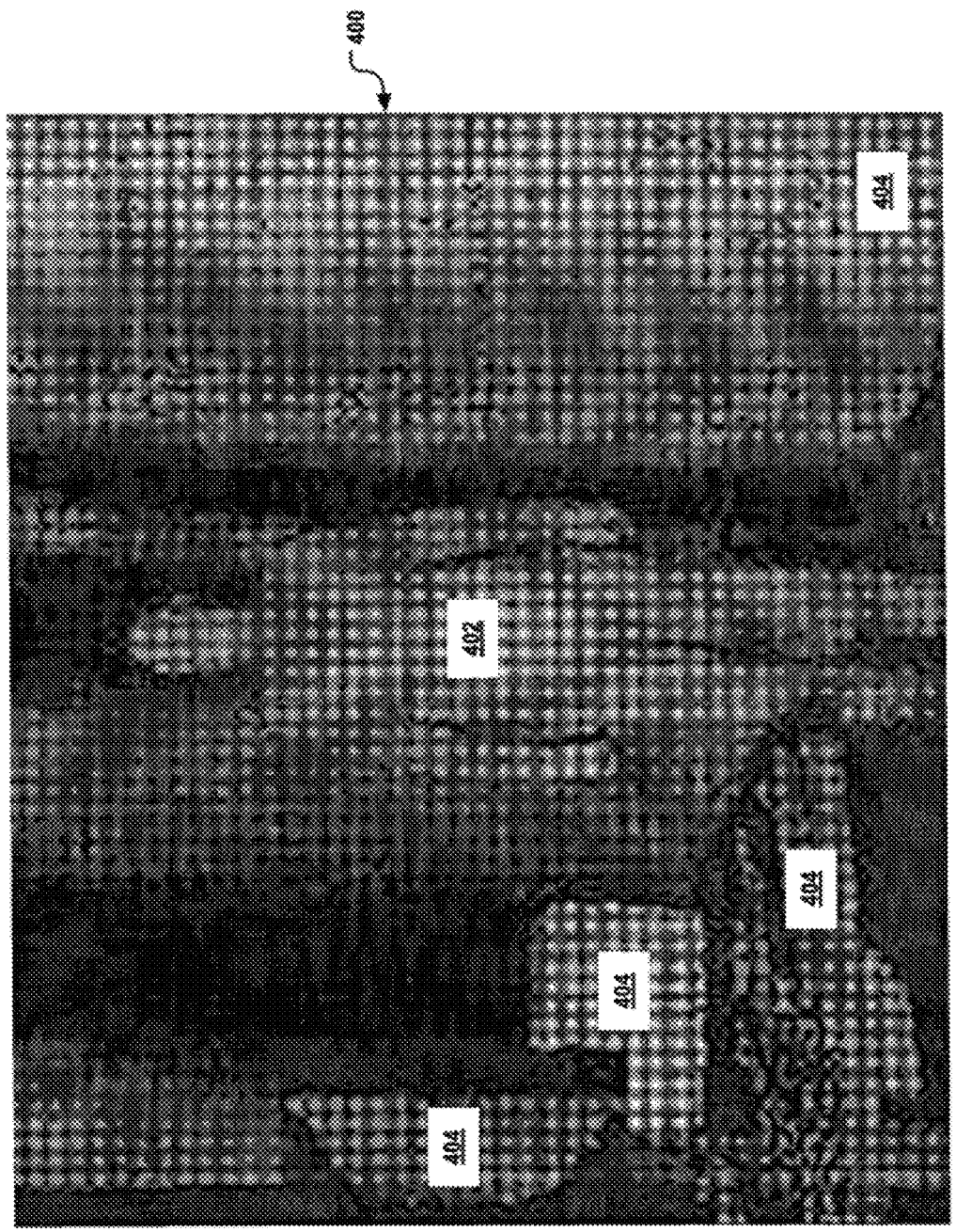
FIG. 6 illustrates an example embodiment of a depth image that may be captured or observed.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402 corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may represent a depth value such as a length or distance in, for example, centimeters, millimeters, or the like of a target or object in the captured scene from the capture device. In one embodiment, the depth image 400 may be colorized such that different colors of the pixels of the depth image correspond to and/or visually depict different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 305, the image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 315, a human target in a depth image may be scanned for one or more body parts. For example, upon receiving a depth image, the target recognition, analysis, and tracking system may determine whether the depth image includes a human target such as the human target 402 described above with respect to FIG. 6 corresponding to, for example, a user such as the user 18, described above with respect to FIGS. 1A-1B. In one embodiment, to determine whether the depth image includes a human target, the target recognition, analysis, and tracking system may flood fill each target or object in the depth image and may compare each flood filled target or object to a pattern associated with a body model of a human in various positions or poses. The flood filled target, or the human target, that matches the pattern may then be scanned to determine values including, for example, locations and/or measurements such as length, width, or the like associated with one or more body parts. For example, the flood filled target, or the human target, that matches the pattern may be isolated and a mask of the human target may be created. The mask may be created by, for example, flood filling the human target such that the human target may be separated from other targets or objects in the scene elements. The mask may then be analyzed to determine the locations and/or measurements for one or more body parts. According to one embodiment, a model such as a skeletal model, a mesh human model, or the like of the human target may be generated based on the locations and/or measurements for the one or more body parts.

In one embodiment, the target recognition, analysis, and tracking system may determine whether a human target in the depth image may have been previously scanned before the human target may be scanned at 315. For example, the capture device such as the capture device 20 described above with respect to FIGS. 1A-2 may capture a scene in frames. Each frame may include a depth image. The depth image of each frame may be analyzed to determine whether the depth image may include a human target as described above. The depth image of each frame may further be analyzed to determine whether the human target may have been previously scanned for one or more body parts. For example, the target recognition, analysis, and tracking system may determine whether a human target in the depth image received, at 305, corresponds to a human target previously scanned. In one embodiment, if the human target may not correspond to a human target previously scanned, the human target may then be scanned at 315. Thus, according to an example embodiment, a human target may be scanned once in an initial frame and initial depth image captured by the capture device that includes the human target.

According to another embodiment, the target recognition, analysis, and tracking system may scan the human target for one or more body parts in each received depth image that includes the human target. The scan results associated with, for example, the measurements for the one or more body parts may then be averaged.

Additionally, in an example embodiment, the target recognition, analysis, and tracking system may determine whether to scan a human target in the depth image, at 310, before the human target may be scanned at 315. For example, the target recognition, analysis, and tracking system may analyze the depth image to determine whether the depth image includes a human target, whether a human target may be in a particular pose such as a standing pose with arms to each side to be scanned, a T-pose or, or any other suitable pose before the target recognition, analysis, and tracking system may scan the human target at 315. The target recognition, analysis, and tracking system may then scan the human target at 315 based on the analysis at 310. For example, the target recognition analysis, and tracking system may scan the human target at 315 if, based on the analysis, at 310 the depth image includes a human target, a human target in the depth image may be in a particular pose, or the like.

Figure 7:
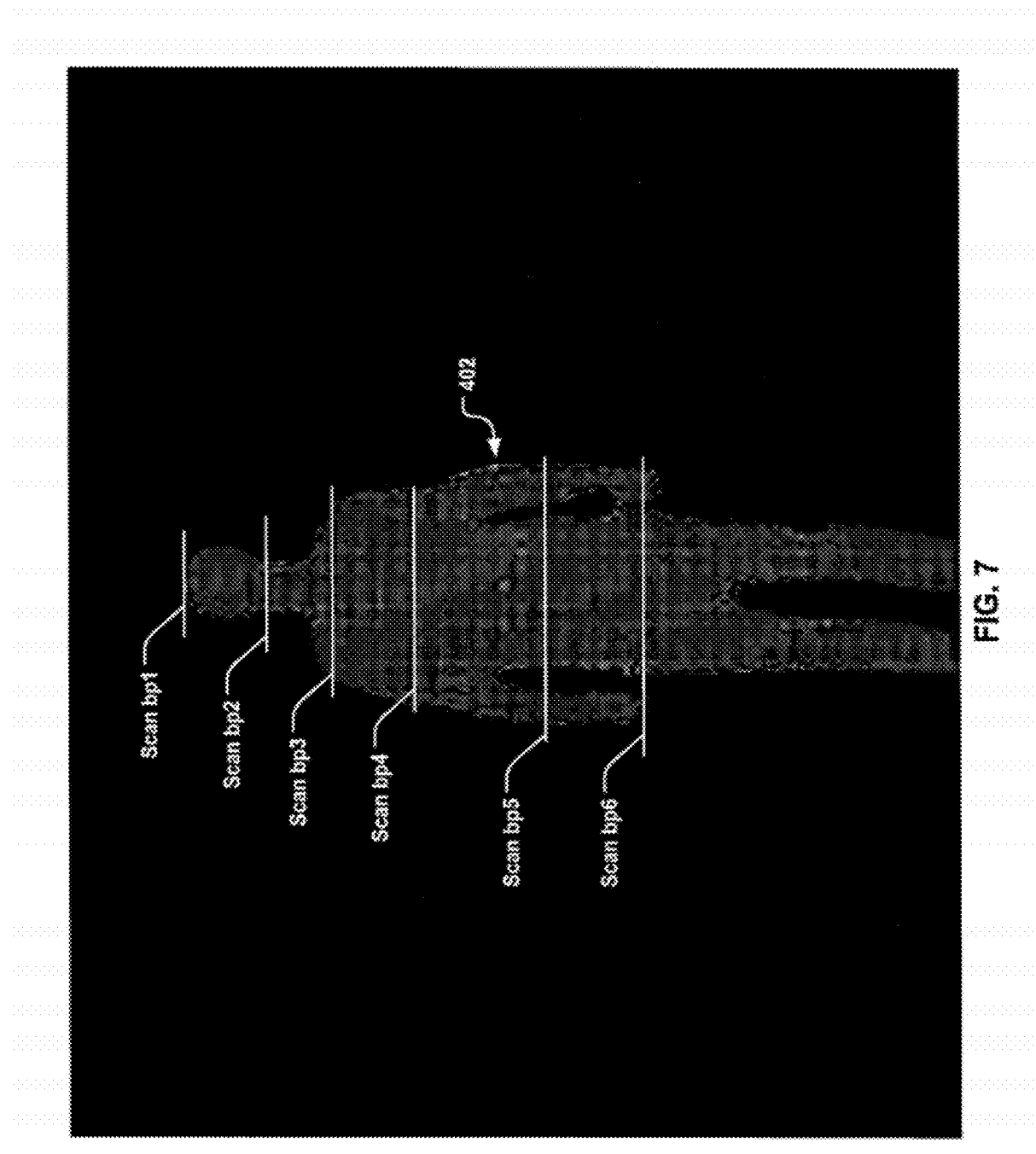
FIG. 7 illustrates an example embodiment of a depth image with a human target being scanned.

FIG. 7 illustrates an example embodiment of a depth image 400 that may include a human target 402 that may be scanned at, for example, 315. For example, after a valid human target such as the human target 402 may be found within the depth image 400, the background or the area of the depth image not matching the human target may be removed. A mask may then be generated for the human target 402 that may include values of the human target along, for example, an X, Y, and Z axis. According to an example embodiment, the mask of the human target 402 may be scanned for various body parts, starting with, for example, the head to generate a skeletal model of the human target 402.

As shown in FIG. 7, the information such as the bits, pixels, or the like associated with the matched human target 402 may be scanned to determine various locations such as scan bp1-scan bp6 that are associated with various parts of the body of the human target 402. For example, after removing the background or area surrounding the human target 402 in the depth image, the depth image 400 may include the human target 402 isolated. The mask that may include X, Y, and Z values may then be generated for the isolated human target 402. The mask of the human target 402 may be scanned to determine a location, a measurement, and other information of various body parts. For example, a top of the mask of the human target 402 may initially be determined. As shown in FIG. 7, the top of the mask of the human target 402 may be associated with a location of the top of the head as indicated by scan bp1. After determining the top of the head, the bitmask may be scanned downward to then determine a location of a neck of the human target 402, a location of the shoulders of the human target 402, or the like.

According to an example embodiment, to determine the location of the neck, shoulders, or the like of the human target 402, a width of the mask, for example, at a position being scanned, may be compared to a threshold value of a typical width associated with, for example, a neck, shoulders, or the like. In an alternative embodiment, the distance from a previous position scanned and associated with a body part in a mask may be used to determine the location of the neck, shoulders or the like.

Additionally, some body parts such as legs, feet, or the like may be calculated based on, for example, the location of other body parts. For example, as described above, the information such as the bits, pixels, or the like associated with the human target 402 may be scanned to determine the locations of various body parts of the human target 402 represented by scan bp1-scan bp6 in FIG. 7. Based on such locations, subsequent body parts such as legs, feet, or the like may then be calculated for the human target 402.

According to an example embodiment, upon determining the values of, for example, a body part, a data structure may be created that may include location and/or measurement values such as length, width, or the like of the body part associated with the scan of the bitmask of the human target 402. In one embodiment, the data structure may include scan results averaged from a plurality depth images. For example, as described above, the capture device such as the capture device 20 described above with respect to FIGS. 1A-2 may capture a scene in frames. Each frame may include a depth image. The depth image of each frame may be analyzed to determine whether a human target may be included as described above. If the depth image of a frame includes a human target, a mask of the human target of the depth image associated with the frame may be scanned for one or more body parts at 310. The determined value of a body part for each frame may then be averaged such that the data structure may include average measurement values such as length, width, or the like of the body part associated with the scans of each frame. According another embodiment, the measurement values of the determined body parts may be adjusted such as scaled up, scaled down, or the like such that measurements values in the data structure more closely correspond to a typical model of a human body.

Figure 8:
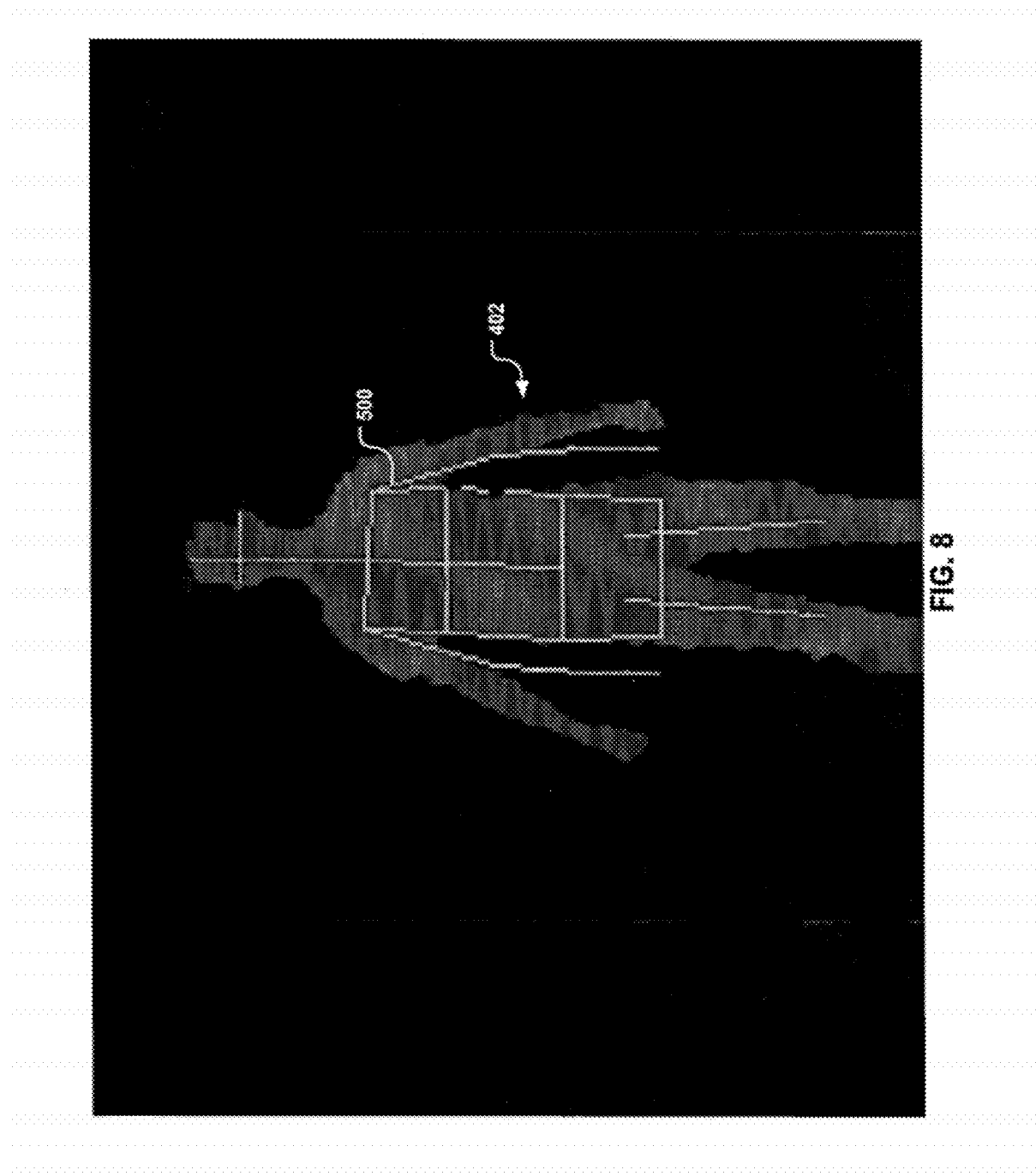
FIG. 8 illustrates an example embodiment of a depth image with a scanned human target.

FIG. 8 illustrates an example embodiment of a depth image with a human target that may have been scanned. As shown in FIG. 8, a model 500 of the human target may be generated based on the scan. For example, according to one embodiment, measurement values determined by the scanned mask may be used to define one or more joints in, for example, a skeletal model such as the model 500. The one or more joints may be used to define one or more bones that may correspond to a body part of a human. According to an example embodiment, the model 500 may include one or more data structures such as mathematical vectors that may define joints and bones of the skeletal model 500 including the measurements and locations of the one or more body parts associated with the joints and bones.

Referring back to FIG. 5, at 320, a tilt angle may be calculated. For example, in one embodiment, the capture device such as the capture device 20 described above with respect to FIGS. 1A-2 may be tilted upward or downward. Information including the depth images captured by the capture device may be distorted or skewed based on the tilt. For example, the depth values associated with the targets or objects in a captured depth image may be inaccurate (i.e. not upright) due to an angle associated with the tilt of the capture device.

According to an example embodiment, the model such as the model 500 described above with respect to FIG. 8 that may be generated from the information may also be skewed based on the tilt. In one embodiment, if the depth values associated with the targets or objects in a captured depth image may be inaccurate, the model generated based on those values may also be inaccurate. For example, if the capture device may be tilted down on a scene, body parts such as the head, shoulders, or the like at the top portion of a human may be closer to the capture device and have nearer depth values than body parts such as the hips, legs, or the like at the lower portion of a human. Depending on the severity of the downward tilt of the capture device, the discrepancy in the depth values may cause the measurements of the one or more body parts determined based on the scan to be inaccurate such that the model based on those measurements may also be inaccurate.

At 320, the target recognition, analysis, and tracking system may calculate an angle associated with an upward or downward tilt of the capture device such that the distorted or skewed information may be adjusted based on the calculated tilt angle, which will be described in more detail below. For example, after scanning the human target at 315, the target recognition, analysis, and tracking system may identify or select, for example, a first portion of the human target associated with an upper body part such as the shoulders of the human target and a second portion of the human target associated with a lower body part such as a midpoint between the hips and knees. The target recognition, analysis, and tracking system may then calculate the tilt angle based on the first and second portions of the human target. For example, the first and second portions may define a line therebetween. According to an example embodiment, the line may be used to calculate a tangent value that may be used to determine the tilt angle, which will be described in more detail below.

Figure 9:
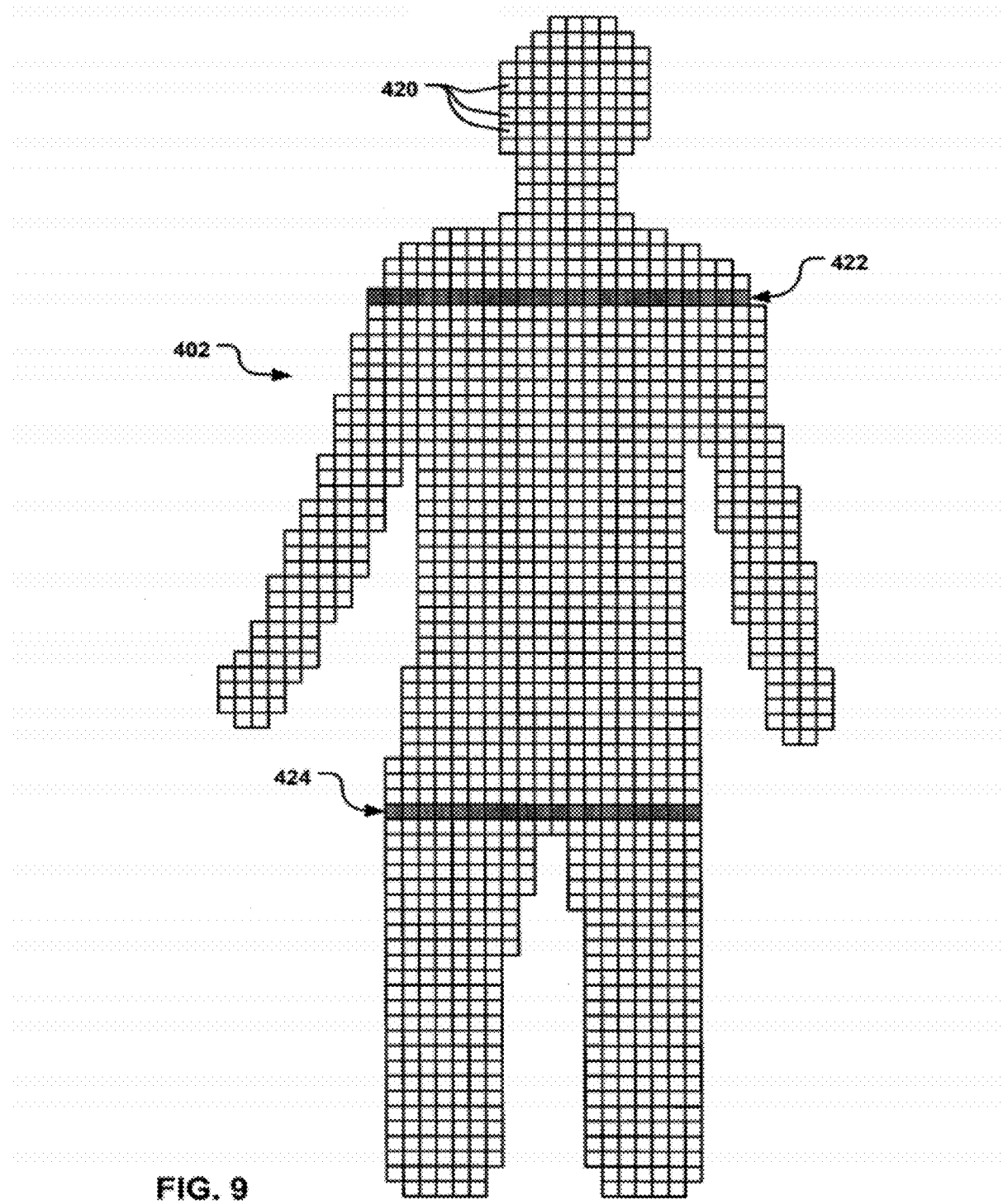
FIG. 9 illustrates an example embodiment of pixels that may define a human target in a depth image.

FIG. 9 illustrates an example embodiment of pixels 420 that may define the human target 402 in, for example, the depth image 400 described above with respect to FIG. 6. For example, the pixels 420 may be a portion or part of the pixels in the 2-D pixel area of the first depth image 400 that may define the human target 402. According to one embodiment, each of the pixels 420 may include a depth value associated therewith that may represent the length or distance in, for example, centimeters, millimeters, or the like of a body part of the human target 402 from the capture device.

As shown in FIG. 9, the human target 402 may include a first portion 422 of pixels and a second portion 424 of pixels. According to an example embodiment, the first and second portions 422, 424 of pixels may be associated with a location of an upper body part of the human target and a lower body part of the target respectively. For example, as described above, the target recognition, analysis, and tracking system may scan a human target such as the human target 402 described above with respect to FIGS. 6-8 to determine the location and measurements of one or more body parts. Upon determining the location and measurements of the one or more body parts, the target recognition, analysis, and tracking system may identify or select a first portion such as the first portion 422 associated with, for example, an upper body part such as the shoulders of the human target 402 determined by scan. Thus, in one embodiment, upon determining the location and/or measurements of the shoulders, the target recognition, analysis, and tracking system may compare the location and/or measurements of, for example, the shoulders, with a mask of the human target 402 in the depth image 400. The target recognition, analysis, and tracking system may then identify a portion of pixels such as the portion 422 that may correspond to the location and/or measurements of the shoulders.

The target recognition, analysis, and tracking system may further identify or select a second portion such as the second portion 424 associated with, for example, lower body part or torso such as a midpoint between the hips and the knees of the human target 402 determined by scan. Thus, in one embodiment, upon determining the location and/or measurements of the hips and knees, the target recognition, analysis, and tracking system may compare the location and/or measurements of, for example, the hips and knees, with the mask of the human target 402 in the depth image 400. The target recognition, analysis, and tracking system may then identify a portion of pixels such as the portion 424 that may correspond to the location and/or measurements of a midpoint between the hips and knees. According to an example embodiment, the first and second portions 422, 424 of the pixels may define a line therebetween that may be used to calculate a tilt angle, which will be described in more detail below.

Figure 10A:
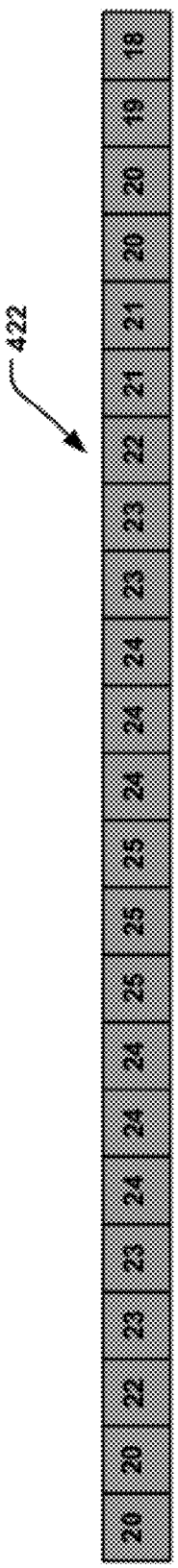
FIGS. 10A-10B illustrate an example embodiment of portions of pixels that may define a human target in a depth image that may be used to calculate a tilt angle for a capture device.
Figure 10B:
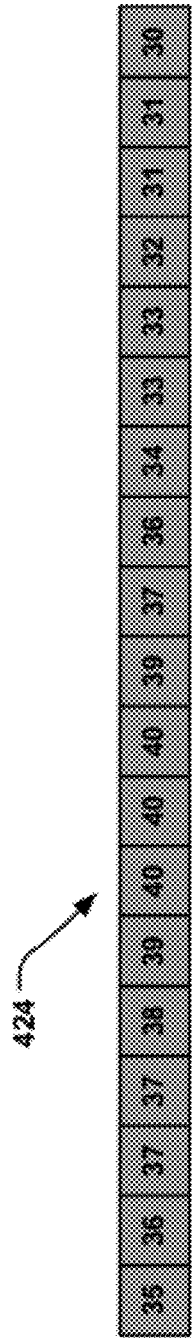

FIGS. 10A-10B illustrate an example embodiment of the first and second portions 422, 424 of pixels associated with a human target in a depth image that may be used to calculate a tilt angle for a capture device. As described above, the first portion 422 may include a strip, a rectangle, or any suitable region of pixels along a first body part such as the shoulders of the human target 402 that may be determined by the scan and the second portion 424 may include a strip, a rectangle or any suitable region of pixels along a second body part such as a midpoint between the hips and knees of the human target that may be determined by the scan.

As shown in FIG. 10A, each of the pixels in the first portion 422 may have a depth value. According to one embodiment, a first average depth value based on the depth values for each of the pixels in the first portion 422 may be calculated. For example, the depth values for each of the pixels in the first portion 422 may be added together to calculate a first sum depth value for the first portion 422. The first sum depth value may then be divided by a total number of valid depth pixels in the first portion 422 to calculate the first average depth value for the first portion 422.

For example, as shown in FIG. 10A, the depth values for each of the pixels in the first portion 422 may be added together to calculate a first sum depth value of 513. The first sum depth value of 513 may be divided by the total number of pixels, 23, of the first portion 422 to calculate a first average depth value of 22.3 for the first portion 422.

Similarly, as shown in FIG. 10B, each of the pixels in the second portion 424 may have a depth value. According to one embodiment, a second average depth value based on the depth values for each of the pixels in the second portion 424 may also be calculated. For example, the valid depth values for each of the pixels in the second portion 422 may be added together to calculate a second sum depth value for the second portion 424. The second sum depth value may then be divided by a total number of pixels in the second portion 424 to calculate the second average depth value for the second portion 424.

For example, as shown in FIG. 10B, the depth values for each of the pixels in the second portion 424 may be added together to calculate a second sum depth value of 678. The second sum depth value of 678 may be divided by the total number of pixels, 19, of the second portion 424 to calculate an average depth value of 35.7 for the second portion 424.

Figure 11:
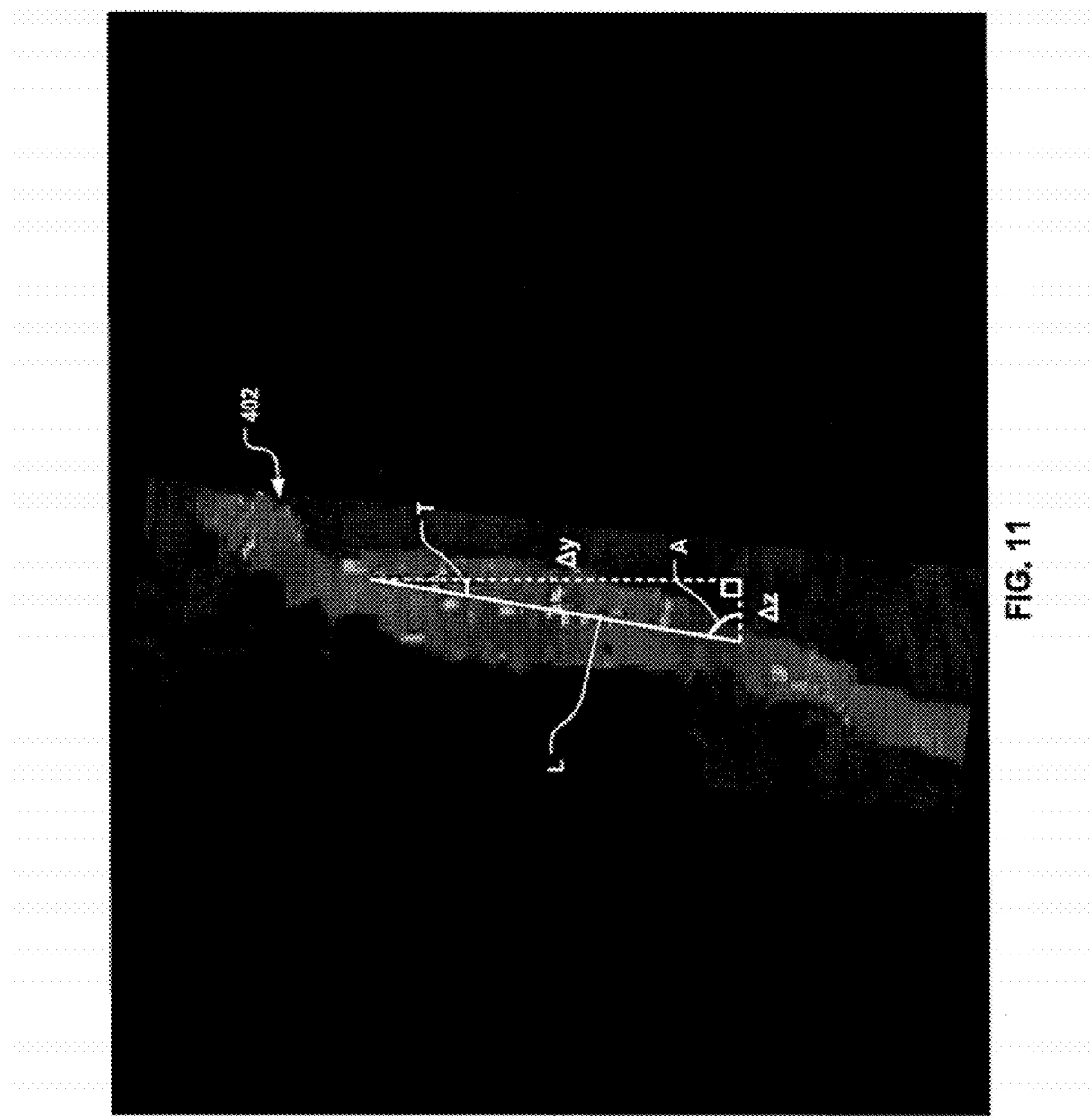
FIG. 11 illustrates a side view of an example embodiment of a depth image with a human target that may be tilted.

FIG. 11 illustrates a side view of an example embodiment of a depth image 400 with a human target 402 that may be tilted. As shown in FIG. 11, in an example embodiment, a line X may be defined between the first and second portions 422, 424 of pixels described above in FIGS. 9-10B that may be used to calculate a tilt angle. For example, the line X may be used to define a hypotenuse of a right triangle as shown in FIG. 11. In one embodiment, an angle T that may be the angle associated with the tilt angle may be calculated based on the arctangent of the second value $\Delta z$ associated with a line opposite of the angle T divided by the first value $\Delta y$ associated with a line adjacent to the angle T. According to another example embodiment, an angle A may be calculated based on the arctangent of a first value $\Delta y$ associated with a line opposite of the angle A divided by a second value $\Delta z$ associated with a line adjacent to the angle A. The angle A may then be subtracted from 90 degrees to determine the angle T that may angle associated with the tilt angle.

According to an example embodiment, the first value $\Delta y$ may be the vertical distance between the first portion 422 and the second potion 424 of pixels described above. For example, each of the pixels associated with the first portion 422 may have a first Y value representing the distance of, for example, the first portion from the bottom of the depth image. Additionally, each of the pixels associated with the second portion 422 may have a second Y value representing the distance of, for example, the second portion 424 from the bottom of the depth image. The first value $\Delta y$ may be the difference between the first and second Y values of the first and second portions 422, 424. For example, in one embodiment, the first Y value associated with the first portion 422 may be 220 and the second Y value associated with the second portion 424 may be 130 such that the first value $\Delta y$ may be 90 or the difference between the first Y value and the second Y value.

In one embodiment, the second value $\Delta z$ may be the difference between the average depth values calculated for the first and second portions 422, 424, as described above. For example, as described above with respect to FIGS. 10A-10B, the first average depth value associated with the first portion 422 may be 22.3 and the second average depth value associated with the second potion 424 of pixels may be 35.7. According to an example embodiment, the second value $\Delta z$ may be 13.4, which is the difference between the first average depth value of 22.3 and the second average depth value of 35.7 for the respective first and second portions 422, 424.

According to one embodiment, the angle T that may be the angle of the tilt angle may be calculated based on the arctangent of the second value $\Delta z$ divided by the first value $\Delta y$. Thus, if the first value $\Delta y$ may be 90 and the second value $\Delta z$ may be 13.4 as described above, the angle A may be the $\tan^{-1}$ (13.4/90) or 8.5 degrees.

As described above, in another example embodiment, the angle A may be calculated based on the arctangent of the first value $\Delta y$ divided by the second value $\Delta z$. Thus, if the first value $\Delta y$ may be 90 and the second value $\Delta z$ may be 13.4 as described above, the angle A may be the $\tan^{-1}$ (90/13.4) or 81.5 degrees. In an example embodiment, the tilt angle may then be determined based on the angle A. For example, the tilt angle may be calculated by subtracting the angle A from the angle of the human target when the camera may not be tilted, or 90 degrees. Thus, as described above, if the angle A is 81.5 degrees, the tilt angle may be 90 degrees minus 81.5 degrees, or 8.5 degrees.

Referring back to FIG. 5, the target recognition, analysis, and tracking system may determine, at 325, whether to receive a subsequent frame. For example, as described above, the capture device such as the capture device 20 described above with respect to FIGS. 1A-2 may capture a scene in frames. Each frame may include a depth image. In an example embodiment, the tilt angle may be calculated for and averaged with depth images in a series of the frames. For example, the target recognition, analysis, and tracking system may receive a first depth image of the first frame, at 305, that may be used to calculate a first tilt angle at 320 as described above. If the target recognition, analysis and tracking system determines to receive a second frame to calculate the tilt angle, at 325, the target recognition, analysis and tracking system may receive a second depth image associated with the second frame at 305. A second tilt angle may then be calculated at 320 as described above. The first and second tilt angles may then be averaged together, at 320, to calculate the tilt angle. Thus, in one embodiment, the target recognition, analysis, and tracking system may average the first tilt angle with tilt angles over, for example, the tilt angles calculated for each of the n frames to generate the tilt angle.

At 325, if the target recognition, analysis, and tracking system determines not to receive a subsequent frame, the tilt angle may be processed at 33. According to one embodiment, the tilt angle may be processed to physically adjust a capture device, the target human model based on the tilt angle and/or transform (i.e. rotate) the captured depth image and/or RGB image from the capture device at 330. For example, a capture device such as the capture device 20 described above with respect to FIGS. 1A-2 may include a tilt correction mechanism such the tilt correction mechanism 52. According to an example embodiment, the tilt correction mechanism may adjust the capture device in an appropriate direction such as upward or downward by, for example, the tilt angle.

Additionally, as described above, the target recognition, analysis, and tracking system may generate a model such as a skeletal model, a mesh model, or the like based on the scan at 315. According to an example embodiment, the model may be adjusted in an appropriate direction such as forward or backward by, for example, the tilt angle.

According to another embodiment, the target recognition, analysis, and tracking system may process the tilt angle to determine a background or a non-player environment of the depth image, determine skewed depth values, or may adjust any other information such as RGB images, IR data, or the like that may be included in the target, analysis, and tracking system.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A method, comprising:
  receiving depth data, by a computer, the depth data having been captured from a camera component;
  scanning, by the computer, a human target in the depth data;
  identifying, by the computer, a first portion of pixels of the human target at the location of an upper body part of the human target;
  identifying, by the computer, a second portion of pixels of the human target at the location of a lower body part of the human target; and
  calculating, by the computer, a tilt angle of the human target relative to the camera component based on the first and second portions of pixels.

2. The method of claim 1, wherein the upper body part comprises the shoulders of the human target, and the lower body part comprises the hips of the human target or the knees of the human target.

3. The method of claim 1, wherein each of the pixels in the first portion and second portion of pixels has a depth value associated therewith.

4. The method of claim 3, wherein calculating the tilt angle based on the scanned human target further comprises:
  calculating a first value associated with a vertical distance between the first and second portions.

5. The method of claim 4, wherein calculating the tilt angle based on the scanned human target further comprises:
  calculating a first average depth value using the depth value for at least one pixel in the first portion;
  calculating a second average depth value using the depth value for at least one pixel in the second portion; and
  subtracting the second average depth value from the first average depth value to calculate a second value.

6. The method of claim 5, wherein calculating the tilt angle based on the scanned human target further comprises:
  calculating an arctangent of the second value divided by the first value to determine the tilt angle.

7. A computer-readable storage device having stored thereon computer executable instructions for detecting a tilt, that, when executed on a computer, cause the computer to perform operations comprising:
  receiving depth data, the depth data having been captured from a camera component;
  scanning a human target in the depth data to determine a location of at least an upper body part and a lower body part;
  identifying a first portion of pixels of the human target at the location of an upper body part of the human target;
  identifying a second portion of pixels of the human target at the location of a lower body part of the human target; and
  calculating a tilt angle of the human target relative to the camera component based on the first and second portions of pixels.

8. The computer-readable storage medium of claim 7, wherein the upper body part comprises shoulders of the human target and the lower body part comprises a midpoint between the hips and the knees of the human target.

9. The computer-readable storage device of claim 7, wherein at least one of the pixels in each of the first portion and second portion of pixels has a depth value associated therewith.

10. The computer-readable storage device of claim 9, wherein calculating the tilt angle using the upper body part and the lower body part comprises:

calculating a first value associated with a vertical distance between the first and second portions.

11. The computer-readable storage device of claim 10, wherein calculating the tilt angle using the upper body part and the lower body part comprises:
   calculating a first average depth value using the depth value for each pixel in the first portion;
   calculating a second average depth value using the depth value for each pixel in the second portion; and
   subtracting the second average depth value from the first average depth value to calculate a second value.

12. The computer-readable storage device of 11, wherein calculating a tilt angle using the location of the upper body part and the lower body part comprises:
   calculating an arctangent of the second value divided by the first value to determine the tilt angle.

13. A system for detecting a tilt, the system comprising:
   a capture device, wherein the capture device comprises a camera component that receives depth data of a scene, wherein the depth data comprises a human target associated with a user; and
   a computing device in operative communication with the capture device, wherein the computing device comprises a processor that receives the depth data from the capture device, determines a location of an upper body part and a lower body part of human target in the depth data, selects a first portion of pixels of the human target associated with the upper body part and a second portion of pixels of the human target associated with the lower body part, and calculates a tilt angle between the human target and the capture device using the first portion of pixels and the second portion of pixels.

14. The system of claim 13, wherein each of the pixels in the first portion and second portion of pixels has a depth value associated therewith.

15. The system of claim 14, wherein processor further calculates a tilt angle using the first portion of pixels and the second portion of pixels by calculating a first value associated with the vertical distance between the first and second portions.

16. The system of claim 15, wherein processor further calculates a tilt angle using the first portion of pixels and the second portion of pixels by:
   calculating a first average depth value using the depth value for each pixel in the first portion;
   calculating a second average depth value using the depth value for each pixel in the second portion;
   subtracting the second average depth value from the first average depth value to calculate a second value.

17. The system of 16, wherein processor further calculates a tilt angle using the first portion of pixels and the second portion of pixels by:
   calculating an arctangent of the second value divided by the first value to determine the tilt angle.

* * * * *

UNITED STATES PATENT AND TRADEMARK OFFICE
CERTIFICATE OF CORRECTION

| | | |
|---|---|---|
| PATENT NO. | : 8,340,432 B2 | Page 1 of 1 |
| APPLICATION NO. | : 12/485804 | |
| DATED | : December 25, 2012 | |
| INVENTOR(S) | : Mathe et al. | |

It is certified that error appears in the above-identified patent and that said Letters Patent is hereby corrected as shown below:

In The Claims

In Column 19, line 12, In Claim 12, after "of" insert -- claim --.

Signed and Sealed this
Third Day of February, 2015

Michelle K. Lee
*Deputy Director of the United States Patent and Trademark Office*